(12) United States Patent
Amouzadeh Tabrizi et al.

(10) Patent No.: US 10,759,684 B2
(45) Date of Patent: Sep. 1, 2020

(54) NANOMOTORS FOR REDUCTION OF NITROARENES

(71) Applicants: Mahmoud Amouzadeh Tabrizi, Tehran (IR); Mojtaba Shamsipur, Tehran (IR); Reza Saber, Tehran (IR); Saeed Sarkar, Tehran (IR)

(72) Inventors: Mahmoud Amouzadeh Tabrizi, Tehran (IR); Mojtaba Shamsipur, Tehran (IR); Reza Saber, Tehran (IR); Saeed Sarkar, Tehran (IR)

( * ) Notice: Subject to any disclaimer, the term of this patent is extended or adjusted under 35 U.S.C. 154(b) by 119 days.

(21) Appl. No.: 16/175,107

(22) Filed: Oct. 30, 2018

(65) Prior Publication Data
US 2019/0062185 A1     Feb. 28, 2019

Related U.S. Application Data

(60) Provisional application No. 62/579,896, filed on Nov. 1, 2017.

(51) Int. Cl.
*B82Y 15/00* (2011.01)
*B82Y 25/00* (2011.01)
*B82Y 40/00* (2011.01)
*C02F 1/70* (2006.01)
*C25D 11/34* (2006.01)
(Continued)

(52) U.S. Cl.
CPC ............... *C02F 1/705* (2013.01); *C25D 5/12* (2013.01); *C25D 5/34* (2013.01); *C25D 7/006* (2013.01); *C25D 7/0614* (2013.01); *C25D 11/34* (2013.01); *B82Y 15/00* (2013.01); *B82Y 25/00* (2013.01); *B82Y 40/00* (2013.01); *C02F 2101/32* (2013.01); *C02F 2101/38* (2013.01);
(Continued)

(58) Field of Classification Search
CPC ......... B82Y 15/00; B82Y 25/00; B82Y 40/00; C02F 1/705; C02F 2101/32; C02F 2101/38; C02F 2305/08; C25D 3/12; C25D 3/22; C25D 5/12; C25D 5/34; C25D 7/006; C25D 7/0614; C25D 11/34
See application file for complete search history.

(56) References Cited

PUBLICATIONS

Tabrizi et al., "A simple method for the fabrication of nanomotors based on a gold nanosheet decorated with CoPt nanoparticles," RSC Adv., (2015), 5, pp. 51508-51511. (Year: 2015).*

* cited by examiner

*Primary Examiner* — Lucas A Stelling
(74) *Attorney, Agent, or Firm* — Bajwa IP Law Firm; Haris Zaheer Bajwa

(57) ABSTRACT

A method for decontamination of nitroarenes including fabricating an exemplary nanomotor and chemically reducing nitroarenes of an acidic solution using the exemplary nanomotor. Fabricating the exemplary nanomotor may include depositing a plurality of magnetic nanoparticles on an Au nanosheet and depositing a plurality of zinc (Zn) nanoparticles on the plurality of magnetic nanoparticles. Chemically reducing the nitroarenes of the acidic solution may include generating hydrogen bubbles in the acidic solution by adding the exemplary nanomotor to the acidic solution and guiding the exemplary nanomotor in the acidic solution by applying a magnetic force to the exemplary nanomotor. Generating the hydrogen bubbles in the acidic solution may include reducing hydrogen ions in the acidic solution through a chemical reaction between the hydrogen ions and the plurality of Zn nanoparticles.

20 Claims, 19 Drawing Sheets

(51) Int. Cl.
  *C25D 3/12* (2006.01)
  *C25D 3/22* (2006.01)
  *C25D 5/12* (2006.01)
  *C25D 5/34* (2006.01)
  *C25D 7/00* (2006.01)
  *C25D 7/06* (2006.01)
  *C02F 101/32* (2006.01)
  *C02F 101/38* (2006.01)

(52) U.S. Cl.
  CPC ............ *C02F 2305/08* (2013.01); *C25D 3/12* (2013.01); *C25D 3/22* (2013.01)

NANOMOTORS FOR REDUCTION OF NITROARENES

CROSS-REFERENCE TO RELATED APPLICATION

This application claims the benefit of priority from pending U.S. Provisional Patent Application Ser. No. 62/579,896, filed on Nov. 1, 2017, and entitled "SELF-PROPELLED NANOMOTOR AS AN ACTIVE NANOCATALYST FOR REDUCTION OF NITROARENES: CLEANING POLLUTED WATER," which is incorporated herein by reference in its entirety.

TECHNICAL FIELD

The present disclosure generally relates to a method for reduction of organic pollutant in wastewater, particularly to a method for decontamination of nitroarenes using nanomotors, and more particularly to a method for reduction of nitroarenes using hydrogen-propelled nanomotors.

BACKGROUND

Nitroarenes are one of the most important organic compounds that are utilized in industrial and agricultural applications as intermediates in the manufacturing of pharmaceuticals, pesticides, pigments, dyes, and rubber chemicals. However, nitroarenes have many harmful health impacts, such as skin and eye irritation due to direct contact with nitroarenes. Also, nitro-anion radicals generated from nitroarenes have mutagenic effects on animals and humans.

Conventional approaches for decontamination of nitroarenes are based on using sodium borohydride ($NaBH_4$) as a reducing agent along with external agitation to accelerate the decontamination process. However, using $NaBH_4$ for reducing nitroarenes have several shortcomings, such as high toxicity, instability, and releasing unwanted toxic waste. In order to overcome the shortcomings of $NaBH_4$ and for efficiently reducing the nitroarenes pollutions, different nanomaterial such as nanomotors have been introduced which may be propelled due to a chemical reaction by different mechanisms, such as self-electrophoresis, self-acoustophoresis, self-thermophoresis, and bubble-propulsion. Therefore, these nanomotors may eliminate a need for external agitation and accelerate the decontamination process.

Hence, there is a need for a safe, simple, and cost-effective method for reducing nitroarenes of wastewater to aminoarenes with high efficiency and without any need for external agitation and negating the needs to use $NaBH_4$ as the reducing agent. Moreover, there is a need for an efficient nanomotor for decontamination of nitroarenes without any toxicity.

SUMMARY

This summary is intended to provide an overview of the subject matter of the exemplary embodiments of the present disclosure, and is not intended to identify essential elements or key elements of the subject matter, nor is it intended to be used to determine the scope of the claimed implementations. The proper scope of the exemplary embodiments of the present disclosure may be ascertained from the claims set forth below in view of the detailed description below and the drawings.

In one general aspect, the present disclosure describes an exemplary method for decontamination of nitroarenes including fabricating an exemplary nanomotor and chemically reducing the nitroarenes of an acidic solution using the exemplary nanomotor. In an exemplary embodiment, fabricating the exemplary nanomotor may include fabricating the exemplary nanomotor using at least one of an electrochemical method, a physical vapor deposition method, a chemical vapor deposition method, and combinations thereof. In an exemplary embodiment, fabricating the exemplary nanomotors may include depositing a plurality of magnetic nanoparticles on an Au nanosheet and depositing a plurality of zinc (Zn) nanoparticles on the plurality of magnetic nanoparticles.

In an exemplary embodiment, chemically reducing the nitroarenes of the acidic solution may include generating hydrogen bubbles in the acidic solution by adding the exemplary nanomotor to the acidic solution and guiding the exemplary nanomotor in the acidic solution by applying a magnetic force to the exemplary nanomotor. In an exemplary embodiment, generating the hydrogen bubbles in the acidic solution may include reducing hydrogen ions of the acidic solution through a chemical reaction between the hydrogen ions and the plurality of Zn nanoparticles of the exemplary nanomotor.

In an exemplary embodiment, guiding the exemplary nanomotor in the acidic solution may include detecting a polluted area in the acidic solution and moving the exemplar nanomotor toward the polluted area by applying the magnetic force to the nanomotor. In one or more exemplary embodiments, the polluted area may include an area of the acidic solution with a nitroarene concentration of at least about 1 mM.

In an exemplary embodiment, generating the hydrogen bubbles in the acidic solution may include propelling the exemplary nanomotor in the acidic solution by chemically reducing the hydrogen ions to the hydrogen bubbles in the acidic solution through the chemical reaction between the hydrogen ions of the acidic solution and the plurality of Zn nanoparticles of the exemplary nanomotor. In an exemplary embodiment, generating the hydrogen bubbles may include adding the exemplary nanomotor with a concentration between about 0.5 mg/ml and about 1.5 mg/ml to the acidic solution.

In an exemplary embodiment, generating the hydrogen bubbles may include adding the exemplary nanomotor to the acidic solution with a nitroarene concentration of at least about 1 mM. In an exemplary embodiment, generating the hydrogen bubbles may include adding the exemplary nanomotor to the acidic solution with a pH level of less than about 4.

In an exemplary embodiment, the nitroarenes may include at least one of 2-nitrophenol, 3-nitrophenol, 4-nitrophenol, 2-nitroaniline, 3-nitroaniline, 4-nitroaniline, and combinations thereof. In an exemplary embodiment, chemically reducing the nitroarenes of the acidic solution may include chemically reducing the nitroarenes to aminoarenes using the exemplary nanomotor with a turn-over frequency (TOF) between about $0.0165$ $s^{-1}$ and about $0.0663$ $s^{-1}$.

In an exemplary embodiment, fabricating the exemplary nanomotors may include forming an Au nanosheet, forming a first functionalized Au nanosheet by depositing a plurality of magnetic nanoparticles on an Au nanosheet, and forming a second functionalized Au nanosheet by depositing a plurality of zinc (Zn) nanoparticles on the plurality of magnetic nanoparticles.

In an exemplary embodiment, forming the Au nanosheet may include forming an anodized Au electrode and reducing the anodized Au electrode. In one or more exemplary embodiments, forming the first functionalized Au nanosheet by depositing the plurality of magnetic nanoparticles on the Au nanosheet may include immersing the Au nanosheet in a solution of magnetic ions at a pH level between about 4 and about 5 and applying an electrical potential to the solution of magnetic ions. In an exemplary embodiment, the solution of magnetic ions may include at least one of $Ni^{2+}$, $Co^{2+}$, and combinations thereof.

In an exemplary embodiment, forming the second functionalized Au nanosheet by depositing the plurality of Zn nanoparticles on the plurality of magnetic nanoparticles may include immersing the first functionalized Au nanosheet in a solution of Zn ions and applying an electrical potential to the solution of Zn ions. In an exemplary embodiment, fabricating the exemplary nanomotor may further include sonicating the second functionalized Au nanosheet.

In another general aspect, the present disclosure describes an exemplary nanomotor for reducing nitroarenes. The exemplary nanomotor may include a gold (Au) nanosheet, a plurality of magnetic nanoparticles deposited on the Au nanosheet, and a plurality of zinc (Zn) nanoparticles deposited on the plurality of magnetic nanoparticles.

In an exemplary embodiment, the Au nanosheet may have a concentration between about 80% and about 90% of the weight of the exemplary nanomotor. In one or more exemplary embodiments, the Au nanosheet may have a thickness between about 60 nm and about 80 nm. In one or more exemplary embodiments, the plurality of Zn nanoparticles may have a concentration between about 10% and about 20% of the weight of the nanomotor.

In an exemplary embodiment, the plurality of Zn nanoparticles and the plurality of magnetic nanoparticles may have a diameter between about 30 nm and about 40 nm. In one or more exemplary embodiments, the plurality of magnetic nanoparticles may have a concentration between about 1% and about 10% of the weight of the exemplary nanomotor.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

Self-propelled nanomotors are a type of nanomotors which may be propelled by different mechanisms, such as self-electrophoresis, self-acoustophoresis, self-thermophoresis, and bubble-propulsion and may be used for decontaminating organic pollutants of solutions. One of the most important advantages of self-propelled nanomotors is the occurrence of self-mixing of the solutions as they move around in the solutions. Therefore, these self-propelled nanomotors may eliminate a need for external agitation and accelerates the decontamination process.

In the present disclosure, an exemplary bubble-propelled nanomotor is disclosed which may generate hydrogen bubbles in an acidic solution and may be propelled using the generated hydrogen bubbles. An exemplary nanomotor of the present disclosure may be used as a heterogeneous catalyst for efficient decontamination of nitroarenes by causing a catalytic reaction between the hydrogen bubbles and the nitroarenes without any need for external agitation and use of sodium borohydride ($NaBH_4$) as a reducing agent.

In addition, an efficient exemplary method is disclosed for decontamination of nitroarenes in an acidic solution using an exemplary nanomotor. The exemplary nanomotor may be an exemplary hydrogen-propelled nanomotor including a plurality of zinc (Zn) nanoparticles for generating hydrogen bubbles by reducing hydrogen ions of the acidic solution. The generated hydrogen bubbles not only may provide a force for moving the exemplary nanomotor but also may reduce the nitroarenes to aminoarenes. Moreover, the exemplary nanomotor may be magnetically guided due to the presence of the plurality of magnetic nanoparticle in the exemplary nanomotor.

Figure 1A:
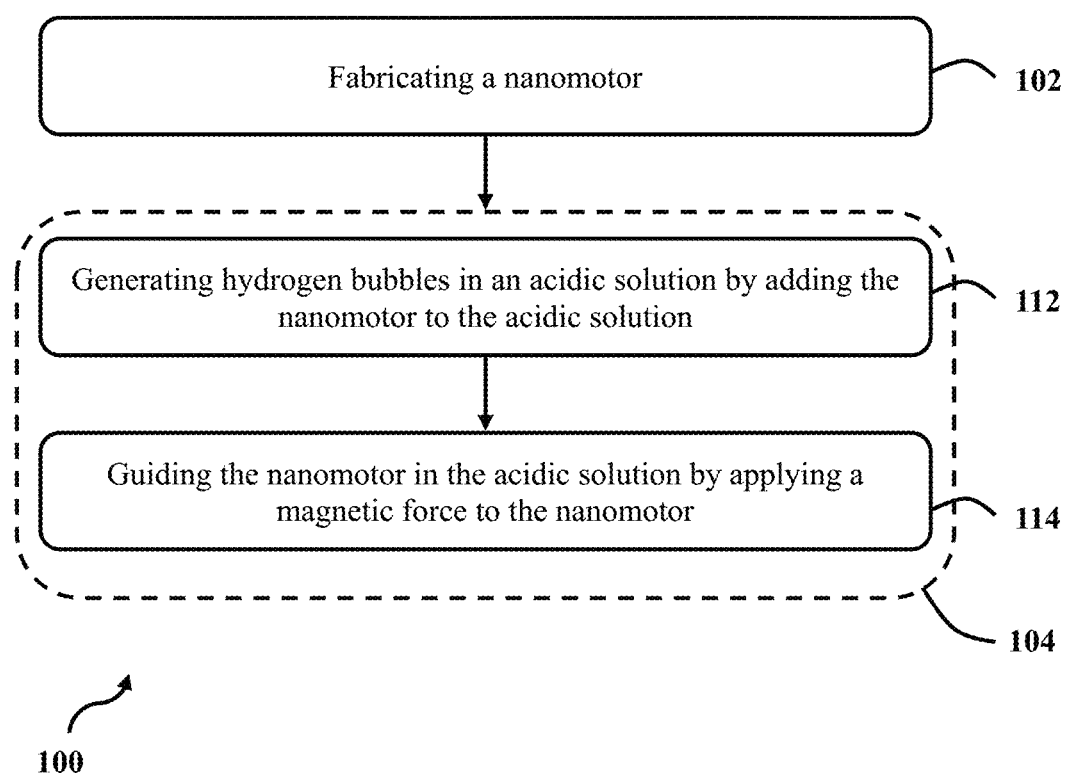
FIG. 1A illustrates a method for decontamination of nitroarenes using an exemplary nanomotor, consistent with one or more exemplary embodiments of the present disclosure.

FIG. 1A illustrates a method 100 for decontamination of nitroarenes using an exemplary nanomotor, consistent with one or more exemplary embodiments of the present disclosure. Method 100 may include fabricating an exemplary nanomotor (step 102) and chemically reducing the nitroarenes in an acidic solution using the exemplary nanomotor (step 104).

In an exemplary embodiment, step 102 may include fabricating the exemplary nanomotor. In an exemplary embodiment, fabricating the exemplary nanomotor may include using at least one of an electrochemical method, a physical vapor deposition method, a chemical vapor deposition method, and combinations thereof.

Figure 1B:
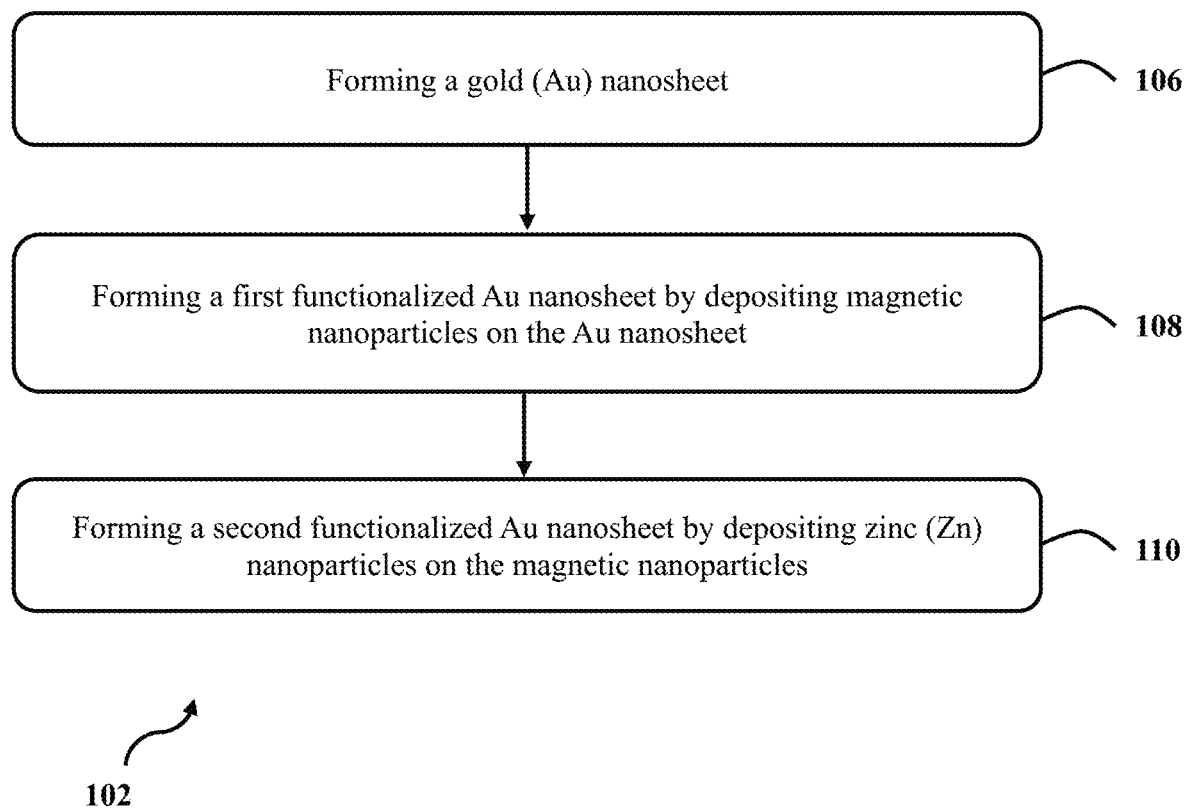
FIG. 1B illustrates a method for fabricating an exemplary nanomotor, consistent with one or more exemplary embodiments of the present disclosure.

FIG. 1B illustrates a method for fabricating an exemplary nanomotor, consistent with one or more exemplary embodiments of the present disclosure. In an exemplary embodiment, FIG. 1B illustrates details of the fabrication step 102 of FIG. 1A. Referring to FIG. 1B, fabricating the exemplary nanomotor may include forming a gold (Au) nanosheet (step 106), forming a first functionalized Au nanosheet by depositing a plurality of magnetic nanoparticles on the Au nanosheet (step 108), and forming a second functionalized Au nanosheet by depositing a plurality of zinc (Zn) nanoparticles on the plurality of magnetic nanoparticles (step 110).

In an exemplary embodiment, step 106 may include forming the Au nanosheet by forming an anodized gold (Au) electrode and reducing the anodized Au electrode. In an exemplary embodiment, the Au electrode may be polished prior to using for fabricating the exemplary nanomotor. In one or more exemplary embodiments, the Au electrode may be anodized by applying an electrical potential of about 6 V to the Au electrode using an electrode of Ag|AgCl|saturated KCl as a reference electrode in phosphate buffered solution (PBS) for a time period of about 20 minutes. In an exemplary embodiment, reducing the anodized Au electrode may include reducing the anodized Au electrode by applying an electrical potential of about −0.3 V to the anodized Au electrode for a time period of about 5 minutes.

In an exemplary embodiment, step 108 may include forming the first functionalized Au nanosheet by depositing the plurality of magnetic nanoparticles on the Au nanosheet. In an exemplary embodiment, depositing the plurality of magnetic nanoparticles on the Au nanosheet may include immersing the Au nanosheet in a solution of magnetic ions and applying an electrical potential to the solution of magnetic ions. In an exemplary embodiment, the solution of magnetic ions may have a pH level between about 4 and about 5. In an exemplary embodiment, the solution of magnetic ions may include at least one of $Ni^{2+}$, $Co^{3+}$, and combinations thereof.

In one or more exemplary embodiments, applying the electrical potential to the solution of magnetic ions may include applying the electrical potential between about −1.15 V and about −1.2 V to the solution of magnetic ions containing the Au nanosheet for a period of time between about 7 minutes to about 10 minutes. In an exemplary embodiment, in order to remove residual solution of magnetic ions from the first functionalized Au nanosheet, the first functionalized Au nanosheet may be washed with double distilled water.

In an exemplary embodiment, step 110 may include forming the second functionalized Au nanosheet by depositing the plurality of Zn nanoparticles on the plurality of magnetic nanoparticles. In an exemplary embodiment, depositing the plurality of Zn nanoparticles on the plurality of magnetic nanoparticles may include immersing the first functionalized Au nanosheet in a solution of Zn ions and applying an electrical potential to the solution of Zn ions containing the first functionalized Au nanosheet. In an exemplary embodiment, the solution of Zn ions may have a pH level between about 1.5 and about 2.5.

In an exemplary embodiment, applying the electrical potential to the solution of Zn ions containing the first functionalized Au nanosheet may include applying the electrical potential in a range between about −1 V and −1.2 V to the solution of Zn ions for a time period from about 7 minutes to about 10 minutes. In an exemplary embodiment, in order to remove residual solution of Zn ions from the second functionalized Au nanosheet, the second functionalized Au nanosheet may be washed with double distilled water.

In an exemplary embodiment, fabricating the exemplary nanomotor may further include sonicating the second functionalized Au nanosheet in order to release the exemplary nanomotors with non-uniform structure from the Au electrode into an aqueous solution. In an exemplary embodiment, sonicating the second functionalized Au nanosheet may include immersing the second functionalized Au nanosheet including the plurality of magnetic nanoparticles and the plurality of Zn nanoparticles in double distilled water and sonicating for a period of time between about 5 minutes and 7 minutes. In an exemplary embodiment, powder of exemplary nanomotors may be obtained by centrifuging the aqueous solution containing the exemplary nanomotors at a velocity of about 2000 round per minute (rpm) for a time period of about 5 minutes.

Figure 2:
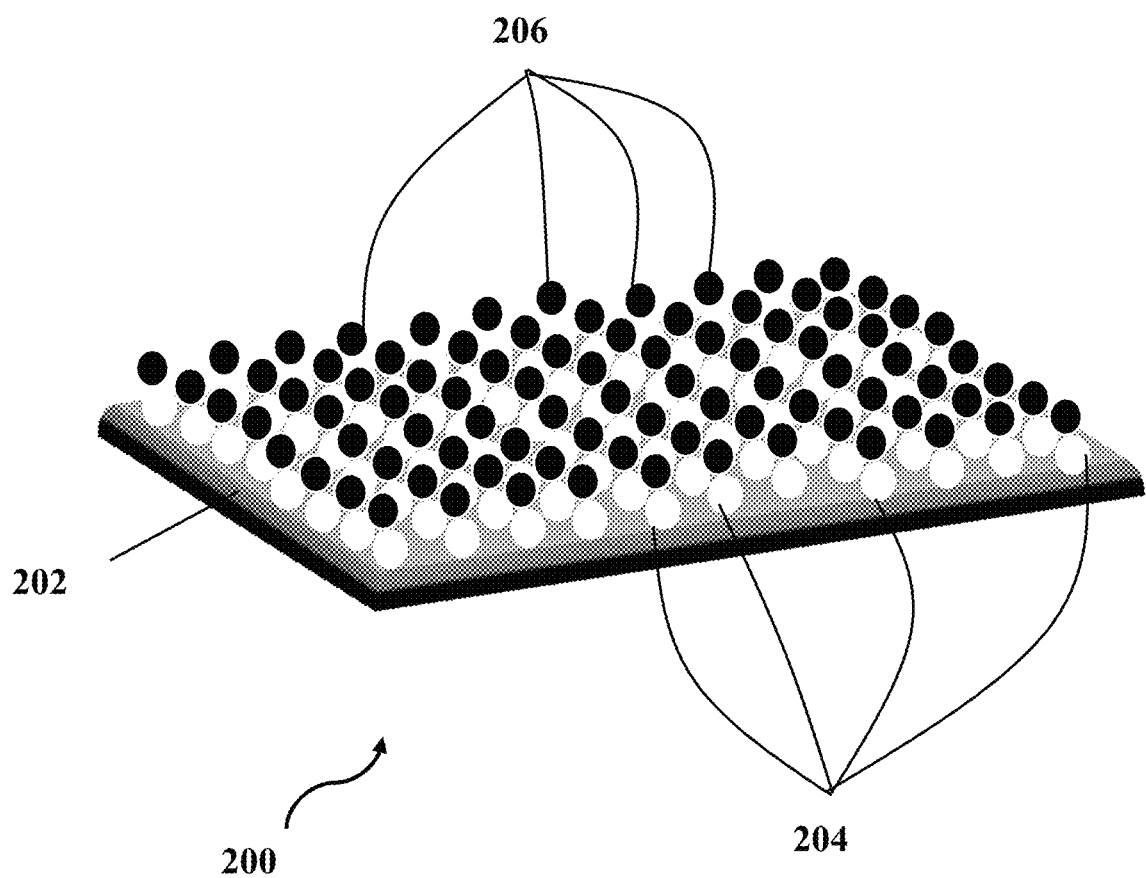
FIG. 2 illustrates a schematic for an exemplary nanomotor, consistent with one or more exemplary embodiments of the present disclosure.

FIG. 2 illustrates a schematic for an exemplary nanomotor 200, consistent with one or more exemplary embodiments of the present disclosure. Exemplary nanomotor 200 may be fabricated using exemplary step 102 of FIG. 1A. Exemplary nanomotor 200 may include an Au nanosheet 202, a plurality of magnetic nanoparticles 204 deposited on Au nanosheet 202, and a plurality of Zn nanoparticles 206 deposited on plurality of magnetic nanoparticles 204.

In an exemplary embodiment, Au nanosheet 202 may have a thickness between about 60 nm and about 80 nm. Au nanosheet 202 may have a concentration between 80% and 90% of the weight of exemplary nanomotor 200. Additionally, plurality of magnetic nanoparticles 204 and plurality of Zn nanoparticles 206 may have a diameter between about 30 nm and about 40 nm.

In an exemplary embodiment, plurality of magnetic nanoparticles 204 may have a concentration between about 1% and about 10% of the weight of exemplary nanomotor 200. Plurality of magnetic nanoparticles 204 may include at least one of nickel (Ni) nanoparticles, cobalt (Co) nanoparticles, and combinations thereof. Furthermore, plurality of Zn nanoparticles 206 may have a concentration between about 10% and about 20% of the weight of exemplary nanomotor 200.

In an exemplary implementation, exemplary nanomotor 200 may be used as a nanocatalyst for chemically reducing the nitroarenes to aminoarenes using the hydrogen bubbles. Exemplary nanomotor 200 may include an exemplary Au nanosheet, a plurality of magnetic nanoparticles deposited on the Au nanosheet, and a plurality of Zn nanoparticles deposited on the plurality of magnetic nanoparticles.

Referring back to FIG. 1A, step 104 may include chemically reducing the nitroarenes in the acidic solution using exemplary nanomotor 200. In an exemplary embodiment, chemically reducing the nitroarenes in the acidic solution may include generating hydrogen bubbles by adding exemplary nanomotor 200 to an acidic solution containing nitroarenes (step 112) and guiding exemplary nanomotor 200 in the acidic solution by applying a magnetic force to exemplary nanomotor 200 (step 114), In detail, step 112 may include generating the hydrogen bubbles in the acidic solution by adding exemplary nanomotor 200 to the acidic solution. Adding exemplary nanomotor 200 to the acidic solution may aid in reducing hydrogen ions of the acidic solution by causing a chemical reaction between the hydrogen ions in the acidic solution and the plurality of Zn nanoparticles of exemplary nanomotor 200. In an exemplary embodiment, hydrogen bubbles may be used as a fuel for exemplary nanomotor 200 and may lead to propelling exemplary nanomotor 200 in the acidic solution by moving exemplary nanomotor 200.

In an exemplary embodiment, generating the hydrogen bubbles by adding exemplary nanomotor 200 to the acidic solution may include adding exemplary nanomotor 200 with a concentration between about 0.5 mg/ml and about 1.5 mg/ml to the acidic solution. Furthermore, the acidic solution may include nitroarenes with a concentration of at least about 1 mM. Additionally, the acidic solution may have a pH level of less than about 4.

In an exemplary embodiment, the chemical reaction between the hydrogen bubbles and the nitroarenes may be caused by using exemplary nanomotor 200 with a turn-over frequency (TOF) between $0.0165\ s^{-1}$ and $0.0663\ s^{-1}$. In an exemplary embodiment, the hydrogen bubbles generated from exemplary nanomotor 200 not only propel exemplary nanomotor 200 in the acidic solution but also reduce the nitroarenes to aminoarenes in a catalytic reaction.

In an exemplary embodiments, the nitroarenes may include at least one of 2-nitrophenol, 3-nitrophenol, 4-nitrophenol, 2-nitroaniline, 3-nitroaniline, 4-nitroaniline, and combinations thereof. In an exemplary embodiment, chemically reducing the nitroarenes to aminoarenes responsive to the chemical reaction between the hydrogen bubbles and the nitroarenes may further include adsorbing the nitroarenes on the Au nanosheet of exemplary nanomotor 200 in the acidic solution.

In an exemplary embodiment, step 114 may include guiding exemplary nanomotor 200 in the acidic solution including guiding the plurality of magnetic nanoparticles by applying a magnetic force to exemplary nanomotor 200. In an exemplary embodiment, applying the magnetic force to exemplary nanomotor 200 may include applying the magnetic force between about 0.5 Tesla and about 1 Tesla using a neodymium (NdFeB) magnet.

Specifically, guiding to exemplary nanomotor 200 in the acidic solution may include detecting a polluted area in the acidic solution and propelling to exemplary nanomotor 200 toward the polluted area by applying the magnetic force to to exemplary nanomotor 200. In an exemplary embodiment, the polluted area may include an area of the acidic solution with a nitroarene concentration of at least about 1 mM.

EXAMPLE 1

Fabricating an Exemplary Nanomotor

In this example, exemplary nanomotors were fabricated through a template-less electrochemical method using an electrochemical cell containing three electrodes including a gold (Au) electrode as a working electrode, a platinum wire as a counter electrode and an Ag|AgCl|saturated KCl electrode as a reference electrode.

First, the Au electrode with a size of about 0.5 mm×0.5 mm was polished successively using alumina slurry at different concentrations of 0.3 μM, 0.1 μM, and 0.05 μM. The polished Au electrode was then cleaned in ethanol and water under ultrasonication. After that, the polished Au electrode was anodized by applying an electrical potential of about 6 V in phosphate buffer (PB) solution with a concentration of about 0.5 M at a pH level of about 7.0 for a time period of about 20 minutes. After that, in order to obtain an Au nanosheet on the Au electrode, the anodized Au electrode was then reduced by applying an electrical potential of about −0.3 V for a time period of about 5 minutes.

In the next step, in order to deposit a plurality of nickel (Ni) nanoparticles as the magnetic nanoparticles on the Au nanosheet, the Au nanosheet was immersed in a nickel (Ni) solution containing $NH_4Cl$ with a concentration of about 1 M, $H_3BO_3$ with a concentration of about 0.1 M at a pH level of about 4.5, and $NiCl_2$ with a concentration of about 0.1 mM, and a potential between about −1.15 V and about −1.2 V was applied to the immersed Au nanosheet for a time period of about 10 minutes to obtain a Ni/Au nanosheet.

Afterward, in order to deposit a plurality of zinc (Zn) nanoparticles on the Ni/Au nanosheet, the Ni/Au nanosheet was washed with double distilled water and immersed in a solution containing $ZnSO_4$ with a concentration of about 0.1 mM and $H_3BO_3$ with a concentration of about 0.1 M at a pH level of about 2.5. After that, a potential of about −1 V was applied to the immersed Ni/Au nanosheet for a time period of about 10 minutes to obtain Zn/Ni/Au nanosheet including the exemplary nanomotors on the Au electrode.

In the end, in order to release the exemplary nanomotors from the Au electrode, the Zn/Ni/Au nanosheet on the Au electrode was washed with water for a time period of about 10 seconds, immersed in doubly distilled water, and sonicated for a time period of about 5 minutes. During the sonication, the Zn/Ni/Au nanosheet was broken into exemplary nanomotors with different structures and the water containing the exemplary nanomotors was centrifuged at a velocity of about 2000 rpm for a time period of about 5 minutes.

EXAMPLE 2

Characterization of an Exemplary Nanomotor

In this example, characterization of exemplary nanomotors was carried out by scanning electron microscopy (SEM), scanning electron microscopy coupled with energy dispersive X-ray spectroscopy (SEM/EDX), and energy dispersive X-ray spectroscopy (EDX).

Figure 3A:
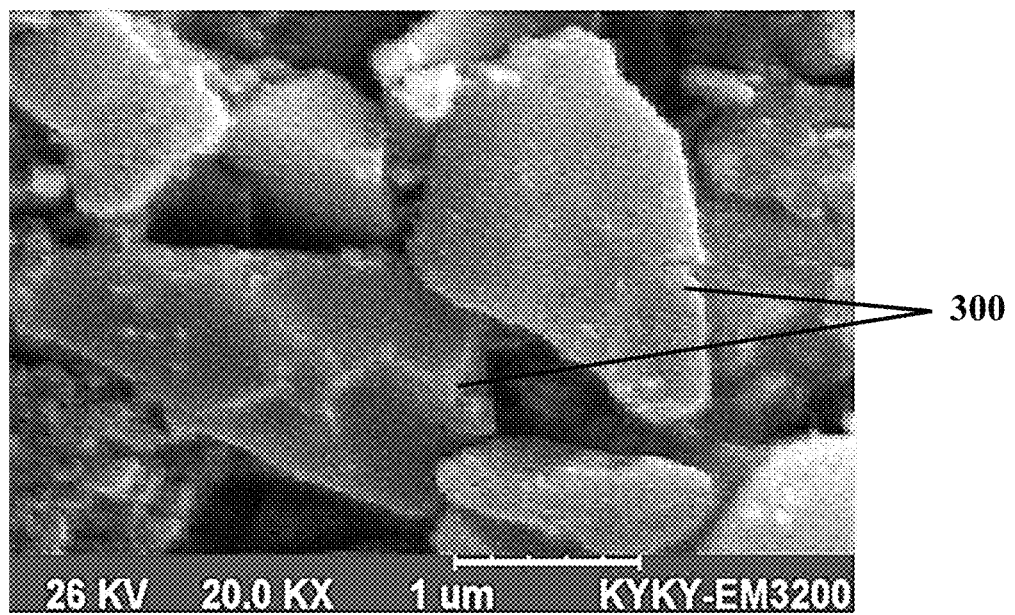
FIG. 3A illustrates a scanning electron microscopy (SEM) micrograph of a gold (Au) nanosheet, consistent with one or more exemplary embodiments of the present disclosure.

FIG. 3A shows a scanning electron microscopy (SEM) micrograph of exemplary gold (Au) nanosheets 300, consistent with one or more exemplary embodiments of the present disclosure. Referring to FIG. 3A, Au nanosheets 300 have different structures because during the sonication process Au nanosheets 300 of the exemplary nanomotors were broken into Au nanosheets with different shapes. Also, the average thickness of Au nanosheets 300 was about 72 nm.

Figure 3B:
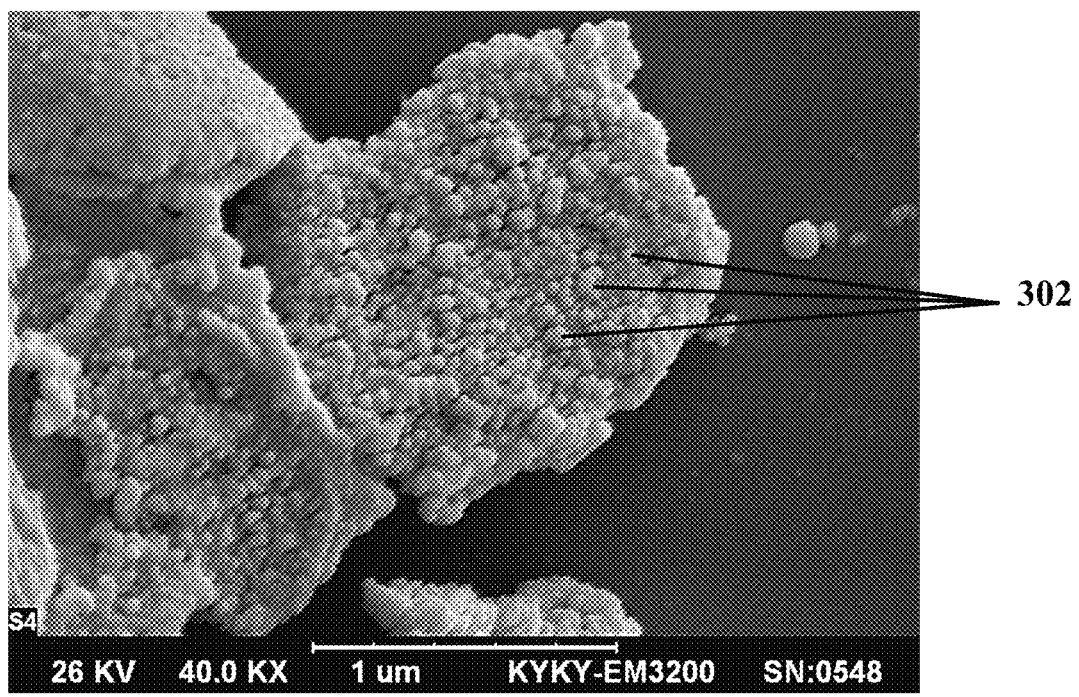
FIG. 3B illustrates an SEM micrograph of an exemplary nanomotor, consistent with one or more exemplary embodiments of the present disclosure.

During electrodeposition, the surface of Au nanosheets was deposited with Zn and Ni nanoparticles. FIG. 3B shows an SEM micrograph of an exemplary nanomotor, consistent with one or more exemplary embodiments of the present disclosure. Referring to FIG. 3B, plurality of Zn nanoparticles 302 have an average size of about 35 nm.

Figure 4:
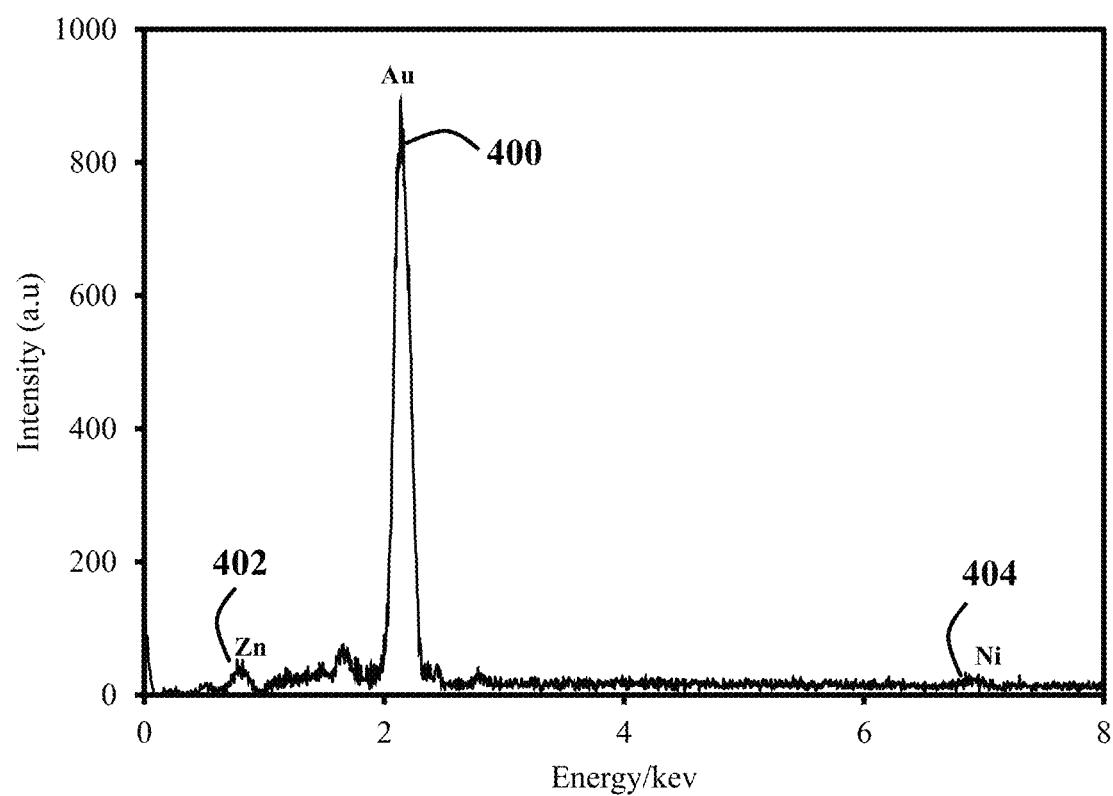
FIG. 4 illustrates an energy-dispersive X-ray spectrum of an exemplary nanomotor, consistent with one or more exemplary embodiments of the present disclosure.

Also, elemental analysis of the exemplary nanomotors was also carried out by EDX. FIG. 4 shows an energy-dispersive X-ray spectrum of an exemplary nanomotor, consistent with one or more exemplary embodiments of the present disclosure. Referring to FIG. 4, the EDX results clearly indicate that the exemplary nanomotors included Au with a concentration of about 83.31 wt %, Ni 5.12 wt % with a concentration of about, and Zn with a concentration of about and 11.49 wt %.

EXAMPLE 3

Catalytic Behavior of an Exemplary Nanomotor

In this example, catalytic behavior of exemplary nanomotors was investigated for decontamination of nitroarenes. At first, about 0.25 ml of the exemplary nanomotors with a concentration about 1 mg/ml was added to a solution including about 1.75 ml of nitroarenes with a concentration of about $5.0 \ 10^{-3}$ M at a pH level of about 1.2 with no external agitation and $NaBH_4$ as a reducing agent.

After adding the exemplary nanomotors to the solution including nitroarenes, hydrogen bubbles were generated due to the reduction of protons by the plurality of Zn nanoparticles. The hydrogen bubbles reduced nitroarenes to aminoarenes with lower toxicity; so, the yellow color of the solution containing nitroarenes gradually vanished. Also, the hydrogen bubbles propelled the exemplary nanomotors in the solution which accelerated the decontamination process of nitroarenes. The constant movement of several exemplary hydrogen-propelled nanomotors across the solution containing nitroarenes resulted in enhanced mass transport without any external agitation and increased the reduction efficiency of nitroarenes at significantly shorter periods of reaction time.

Furthermore, generation of the hydrogen bubbles from the surface of the exemplary nanomotor led to its movement in the acidic solution, and after applying an external magnetic force, the exemplary nanomotor was also quickly moved toward the magnetic direction. In order to determine the catalytic behavior of the exemplary nanomotors, ultraviolet-visible (UV-vis) spectra of the reaction mixture were monitored with the progress of the catalytic reduction of nitroarenes. Also, a kinetic equation for the reduction of a nitroarene could be written as:

$$dA_t/d_t = k\,A_t \qquad \text{Eq. 1}$$

or $$ln(A_t/A_0) = k \times t \qquad \text{Eq. 2}$$

In Eq. 1 and the Eq. 2, At is an absorbance of nitroarenes at time t, $A_0$ is an absorbance of nitroarenes at time of 0, and k is a pseudo-first-order rate constant. The pseudo-first-order rate constant (k) may be obtained from the linear plot of $ln(A_t/A_0)$ versus reaction time. Also, the turn-over frequency (TOF) of different nitroarene catalytic reduction may becalculated using the following equation (Eq. 3):

$$TOF = \frac{\text{Amount of nitroarenes (mol)}}{\text{Mass of nanomotor (g)} \times \text{Zn loading (\%) on nanomotor} \times \frac{1}{\text{Molecular weight of Zn (g/mol)}} \times \text{Time (s)}} \qquad \text{Eq. 3}$$

Figure 5A:
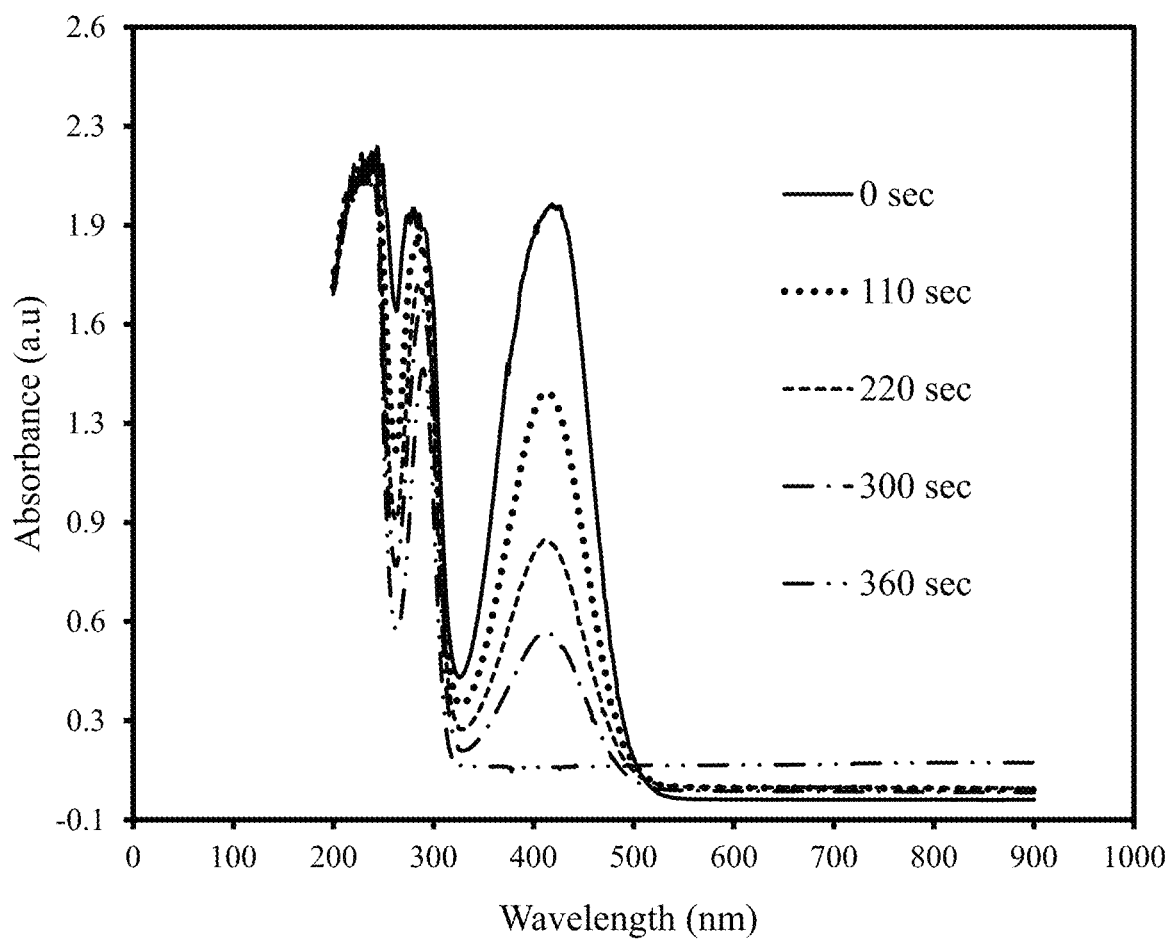
FIG. 5A illustrates a time-dependent ultraviolet-visible (UV-vis) absorption spectrum for reduction of 2-nitroaniline using an exemplary nanomotor, consistent with one or more exemplary embodiments of the present disclosure.
Figure 5B:
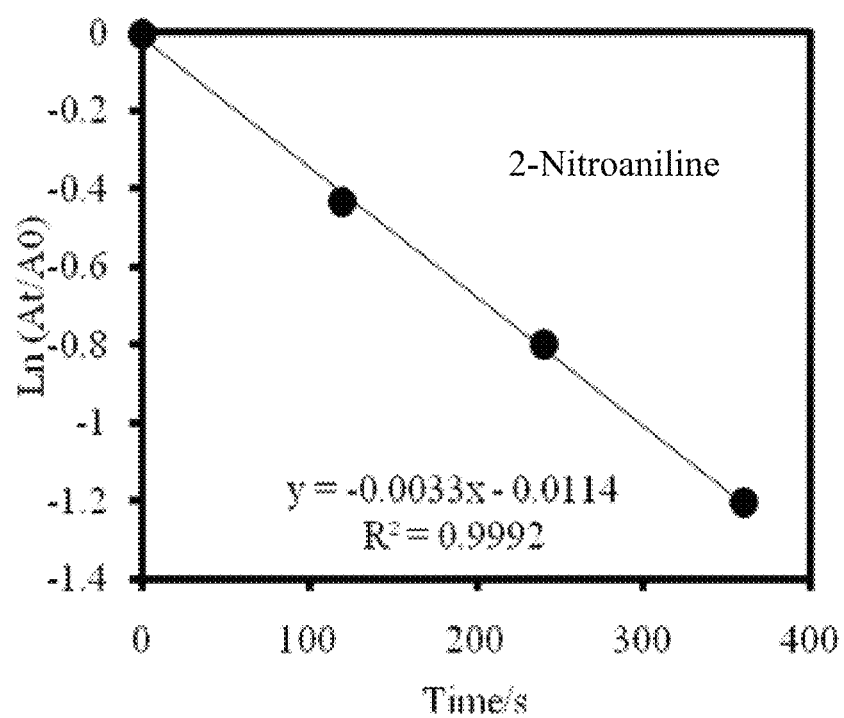
FIG. 5B illustrates a kinetic plot for pseudo-first order reaction for a catalytic reduction of 2-nitroaniline using an exemplary nanomotor, consistent with one or more exemplary embodiments of the present disclosure.

Reduction of 2-Nitroaniline Contamination Using the Exemplary Nanomotor:

At first, reduction of 2-nitroaniline contamination using the exemplary nanomotor was studied. FIG. 5A shows a time-dependent ultraviolet-visible (UV-vis) absorption spectrum for reduction of 2-nitroaniline using an exemplary nanomotor, consistent with one or more exemplary embodiments of the present disclosure. FIG. 5B shows a kinetic plot for pseudo-first order reaction for a catalytic reduction of 2-nitroaniline using an exemplary nanomotor, consistent with one or more exemplary embodiments of the present disclosure.

Referring to FIGS. 5A and 5B, after adding the exemplary nanomotors to the solution containing 2-nitroaniline, the absorption of 2-nitroaniline decreases rapidly, attributed to the reduction of 2-nitroaniline. However, in the absence of the exemplary nanomotor, the reduction of 2-nitroaniline was very negligible and the absorption peak remained unaltered even after 1 hour. Also, the pseudo-first-order rate constant was $0.033 \times 10^{-2}$ and the TOF of 2-nitroaniline catalytic reduction was $0.055\ s^{-1}$ during a period of time of about 360 seconds.

Figure 6A:
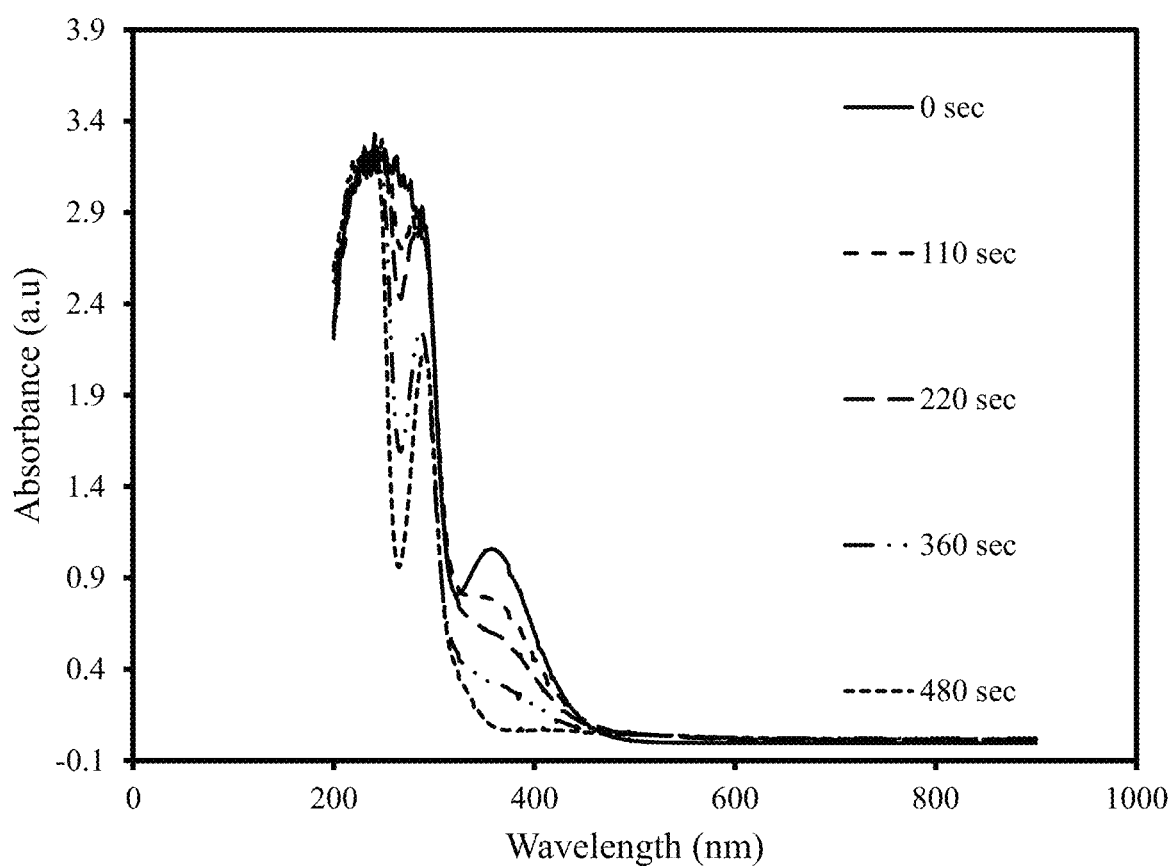
FIG. 6A illustrates a time-dependent ultraviolet-visible (UV-vis) absorption spectrum for reduction of 3-nitroaniline using an exemplary nanomotor, consistent with one or more exemplary embodiments of the present disclosure.
Figure 6B:
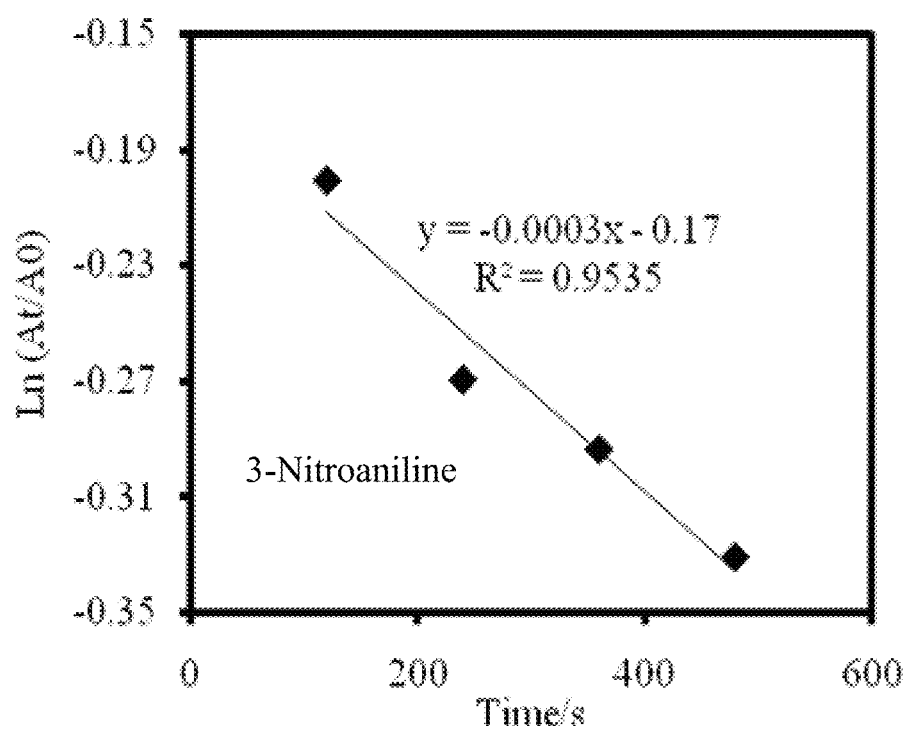
FIG. 6B illustrates a kinetic plot for pseudo-first order reaction for a catalytic reduction of 3-nitroaniline using an exemplary nanomotor, consistent with one or more exemplary embodiments of the present disclosure.

Reduction of 3-Nitroaniline Contamination Using the Exemplary Nanomotor:

After that, reduction of 3-nitroaniline contamination using the exemplary nanomotor was studied. FIG. 6A shows a time-dependent ultraviolet-visible (UV-vis) absorption spectrum for reduction of 3-nitroaniline using an exemplary nanomotor, consistent with one or more exemplary embodiments of the present disclosure. FIG. 6B shows a kinetic plot for pseudo-first order reaction for a catalytic reduction of 3-nitroaniline using an exemplary nanomotor, consistent with one or more exemplary embodiments of the present disclosure.

Referring to FIGS. 6A and 6B, after adding the exemplary nanomotors to the solution containing 3-nitroaniline, the absorption of 3-nitroaniline decreases rapidly, attributed to the reduction of 3-nitroaniline. However, in the absence of the exemplary nanomotor, the reduction of 3-nitroaniline was very negligible and the absorption peak remained unaltered even after 1 hour. Also, the pseudo-first-order rate constant was $0.003 \times 10^{-2}$ and the TOF of 3-nitroaniline catalytic reduction was $0.041$ $s^{-1}$ during a period of time of about 480 seconds.

Figure 7A:
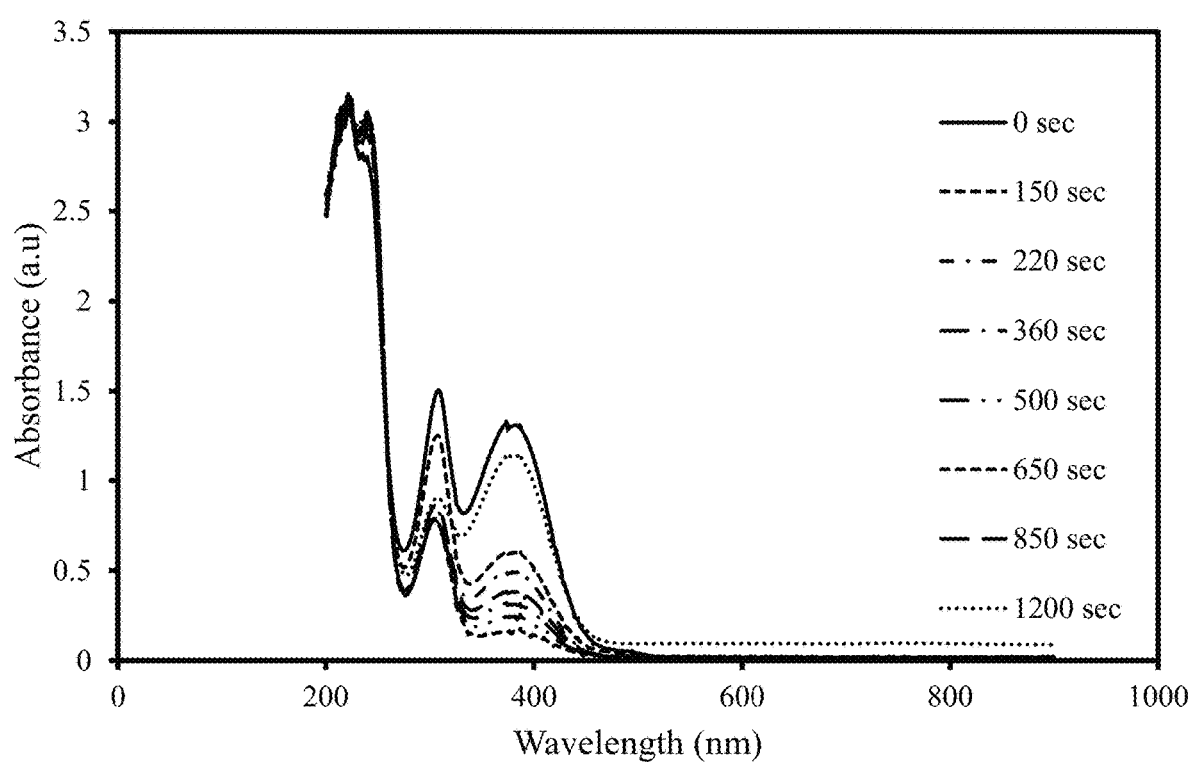
FIG. 7A illustrates a time-dependent ultraviolet-visible (UV-vis) absorption spectrum for reduction of 4-nitroaniline using an exemplary nanomotor, consistent with one or more exemplary embodiments of the present disclosure.
Figure 7B:
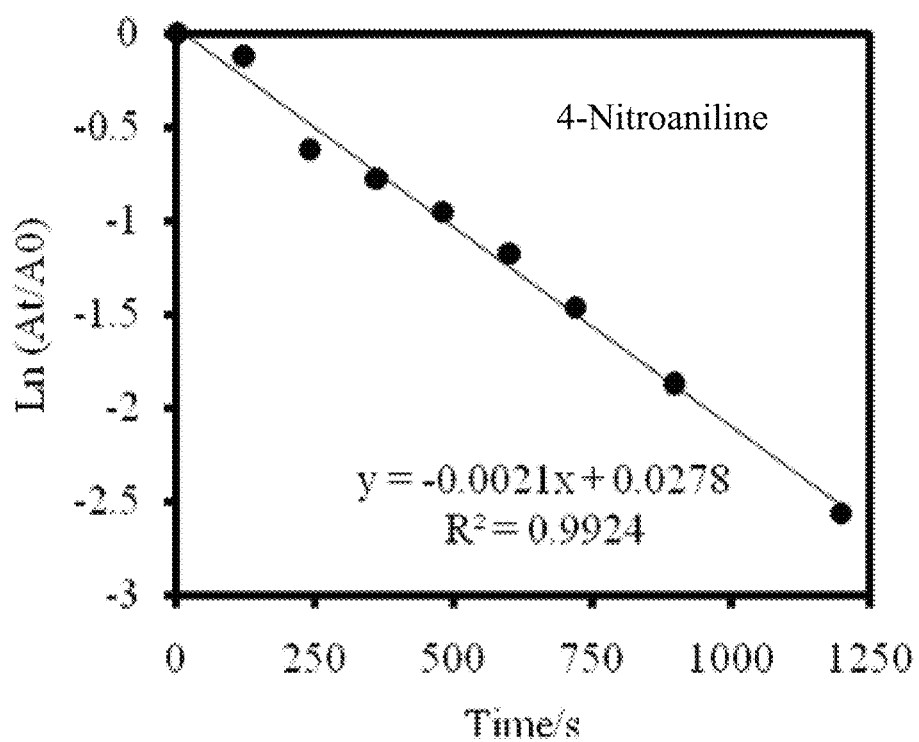
FIG. 7B illustrates a kinetic plot for pseudo-first order reaction for a catalytic reduction of 4-nitroaniline using an exemplary nanomotor, consistent with one or more exemplary embodiments of the present disclosure.

Reduction of 4-Nitroaniline Contamination Using the Exemplary Nanomotor:

Additionally, reduction of 4-nitroaniline contamination using the exemplary nanomotor was studied. FIG. 7A shows a time-dependent ultraviolet-visible (UV-vis) absorption spectrum for reduction of 4-nitroaniline using an exemplary nanomotor, consistent with one or more exemplary embodiments of the present disclosure. FIG. 7B shows a kinetic plot for pseudo-first order reaction for a catalytic reduction of 4-nitroaniline using an exemplary nanomotor, consistent with one or more exemplary embodiments of the present disclosure.

Referring to FIGS. 7A and 7B, after adding the exemplary nanomotors to the solution containing 4-nitroaniline, the absorption of 4-nitroaniline decreases rapidly, attributed to the reduction of 4-nitroaniline. However, in the absence of the exemplary nanomotor, the reduction of 4-nitroaniline was very negligible and the absorption peak remained unaltered even after 1 hour. Also, the pseudo-first-order rate constant was $0.021 \times 10^{-2}$ and the TOF of 4-nitroaniline catalytic reduction was $0.0165$ $s^{-1}$ during 1200 seconds.

Figure 8A:
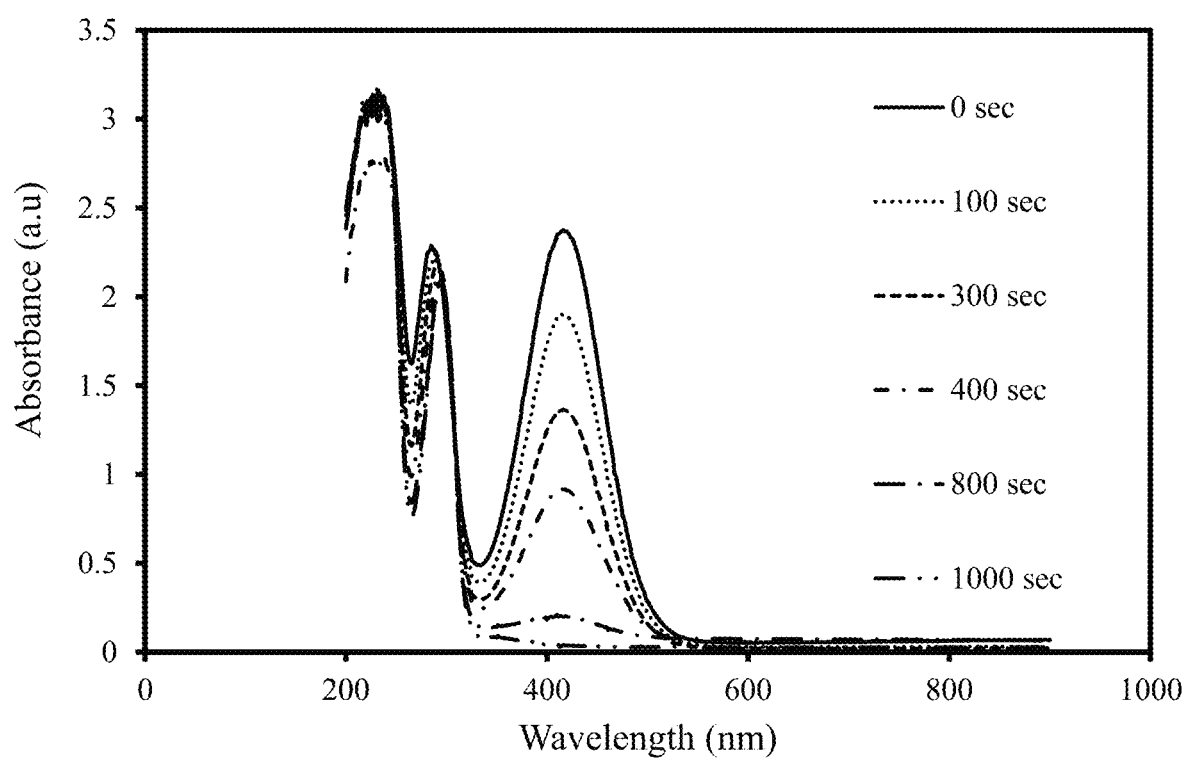
FIG. 8A illustrates a time-dependent ultraviolet-visible (UV-vis) absorption spectrum for reduction of 2-nitrophenol using an exemplary nanomotor, consistent with one or more exemplary embodiments of the present disclosure.
Figure 8B:
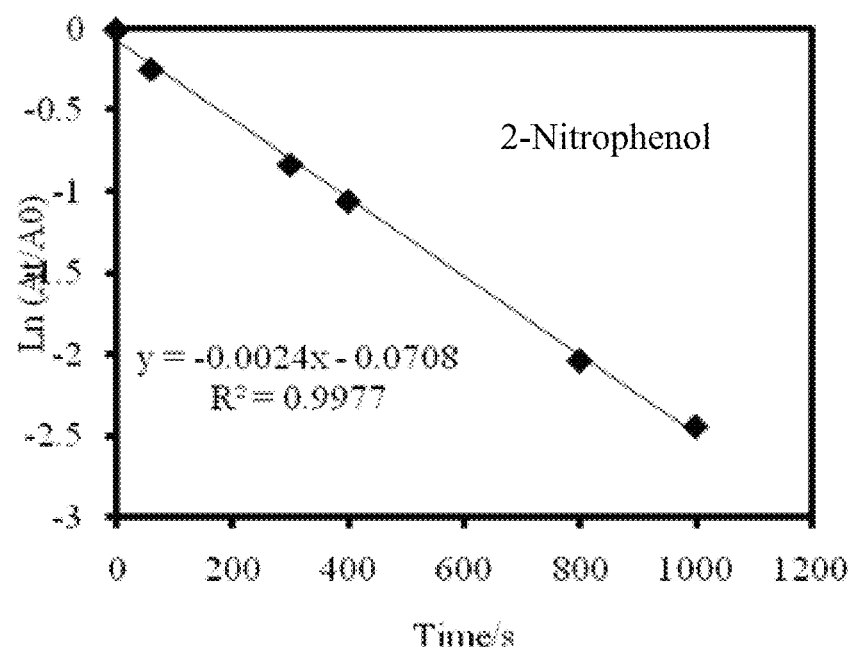
FIG. 8B illustrates a kinetic plot for pseudo-first order reaction for a catalytic reduction of 2-nitrophenol using an exemplary nanomotor, consistent with one or more exemplary embodiments of the present disclosure.

Reduction of 2-Nitrophenol Contamination Using the Exemplary Nanomotor:

Also, reduction of 2-nitrophenol contamination using the exemplary nanomotor was studied. FIG. 8A shows a time-dependent ultraviolet-visible (UV-vis) absorption spectrum for reduction of 2-nitrophenol using an exemplary nanomotor, consistent with one or more exemplary embodiments of the present disclosure. FIG. 8B shows a kinetic plot for pseudo-first order reaction for a catalytic reduction of 2-nitrophenol using an exemplary nanomotor, consistent with one or more exemplary embodiments of the present disclosure.

Referring to FIGS. 8A and 8B, after adding the exemplary nanomotors to the solution containing 2-nitrophenol, the absorption of 2-nitrophenol decreases rapidly, attributed to the reduction of 2-nitrophenol. However, in the absence of the exemplary nanomotor, the reduction of 2-nitrophenol was very negligible and the absorption peak remained unaltered even after 1 hour. Also, the pseudo-first-order rate constant was $0.024 \times 10^{-2}$ and the TOF of 2-nitrophenol catalytic reduction was $0.0199$ $s^{-1}$ during 1000 seconds.

Figure 9A:
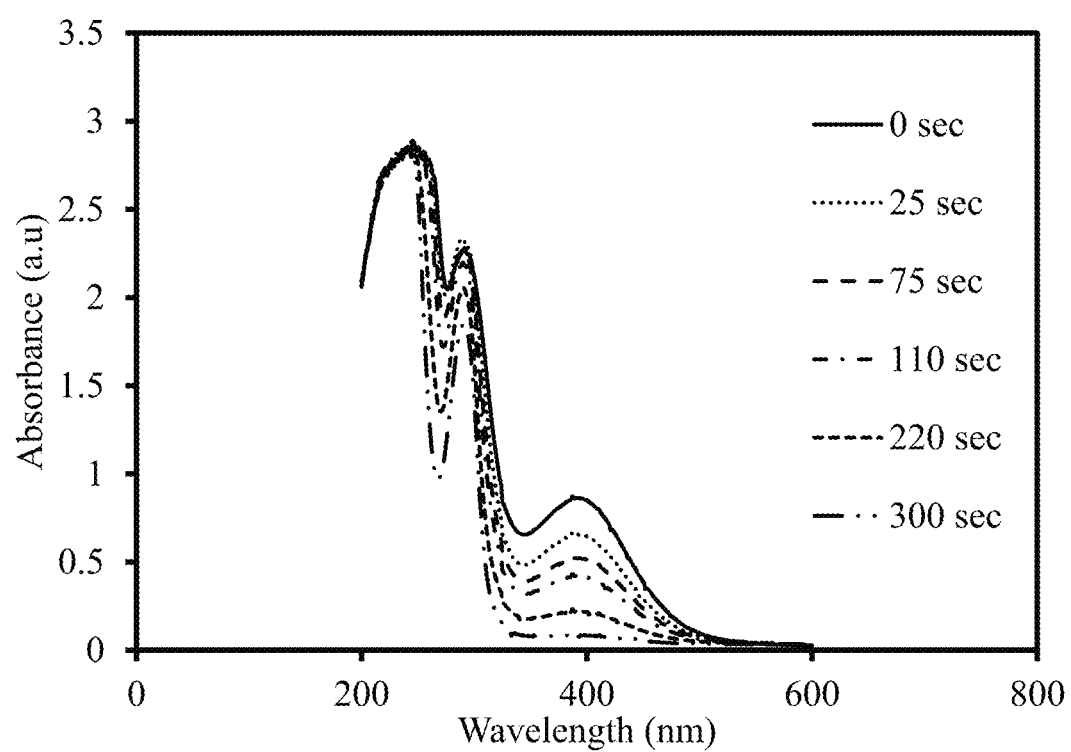
FIG. 9A illustrates a time-dependent ultraviolet-visible (UV-vis) absorption spectrum for reduction of 3-nitrophenol using an exemplary nanomotor, consistent with one or more exemplary embodiments of the present disclosure.
Figure 9B:
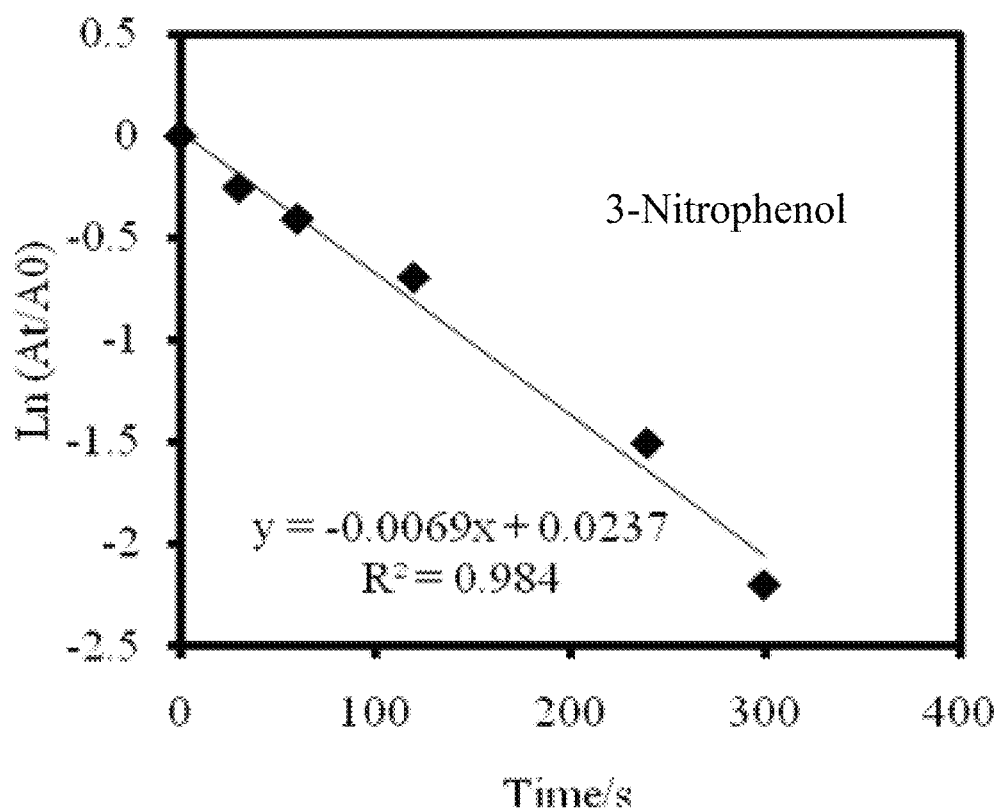
FIG. 9B illustrates a kinetic plot for pseudo-first order reaction for a catalytic reduction of 3-nitrophenol using an exemplary nanomotor, consistent with one or more exemplary embodiments of the present disclosure.

Reduction of 3-Nitrophenol Contamination Using the Exemplary Nanomotor:

Moreover, reduction of 3-nitrophenol contamination using the exemplary nanomotor was studied. FIG. 9A shows a time-dependent ultraviolet-visible (UV-vis) absorption spectrum for reduction of 3-nitrophenol using an exemplary nanomotor, consistent with one or more exemplary embodiments of the present disclosure. FIG. 9B shows a kinetic plot for pseudo-first order reaction for a catalytic reduction of 3-nitrophenol using an exemplary nanomotor, consistent with one or more exemplary embodiments of the present disclosure.

Referring to FIGS. 9A and 9B, after adding the exemplary nanomotors to the solution containing 3-nitrophenol, the absorption of 3-nitrophenol decreases rapidly, attributed to the reduction of 3-nitrophenol. However, in the absence of the exemplary nanomotor, the reduction of 3-nitrophenol was very negligible and the absorption peak remained unaltered even after 1 hour. Also, the pseudo-first-order rate constant was $0.069 \times 10^{-2}$ and the TOF of 2-nitrophenol catalytic reduction was $0.0663$ $s^{-1}$ during a period of time of about 300 seconds.

Figure 10A:
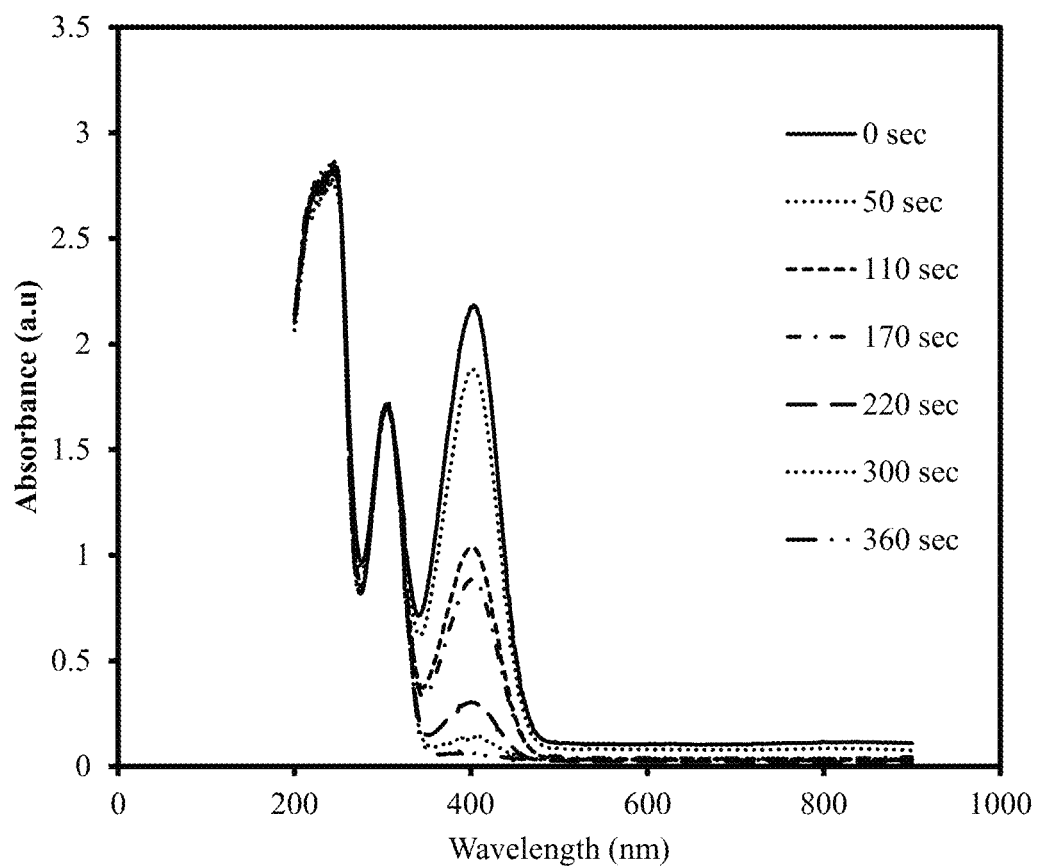
FIG. 10A illustrates a time-dependent ultraviolet-visible (UV-vis) absorption spectrum for reduction of 4-nitrophenol using an exemplary nanomotor, consistent with one or more exemplary embodiments of the present disclosure.
Figure 10B:
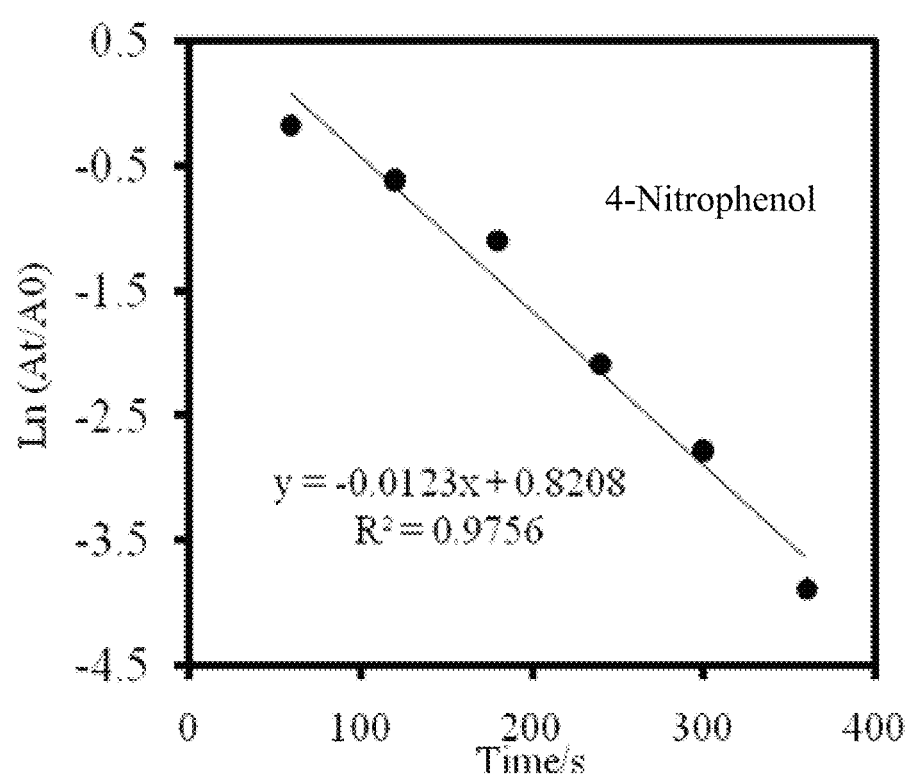
FIG. 10B illustrates a kinetic plot for pseudo-first order reaction for a catalytic reduction of 4-nitrophenol using an exemplary nanomotor, consistent with one or more exemplary embodiments of the present disclosure.

Reduction of 4-Nitrophenol Contamination Using the Exemplary Nanomotor:

Furthermore, reduction of 4-nitrophenol contamination using the exemplary nanomotor was studied. FIG. 10A illustrates a time-dependent ultraviolet-visible (UV-vis) absorption spectrum for reduction of 4-nitrophenol using an exemplary nanomotor, consistent with one or more exemplary embodiments of the present disclosure. FIG. 10B illustrates a kinetic plot for pseudo-first order reaction for a catalytic reduction of 4-nitrophenol using an exemplary nanomotor, consistent with one or more exemplary embodiments of the present disclosure.

Referring to FIGS. 10A and 10B, after adding the exemplary nanomotors to the solution containing 4-nitrophenol, the absorption of 4-nitrophenol decreases rapidly, attributed to the reduction of 4-nitrophenol. However, in the absence of the exemplary nanomotor, the reduction of 4-nitrophenol was very negligible and the absorption peak remained unaltered even after 1 hour. Also, the pseudo-first-order rate constant was $1.23 \times 10^{-2}$ and the TOF of 2-nitrophenol catalytic reduction was $0.0553$ $s^{-1}$ during a period of time of about 360 seconds.

According to TOF of the catalytic reactions for reduction of different nitroarenes, it may be concluded that the exemplary nanomotors exhibited high reactivity with excellent yields toward a series of nitroarenes, especially toward 2-nitrophenol and 3-nitrophenol compared to other nitroarenes. The stability of the exemplary nanomotor was also evaluated. The exemplary nanomotors were separated by placing the tube in a magnetic stand and then washed four times with distilled water.

Figure 10C:
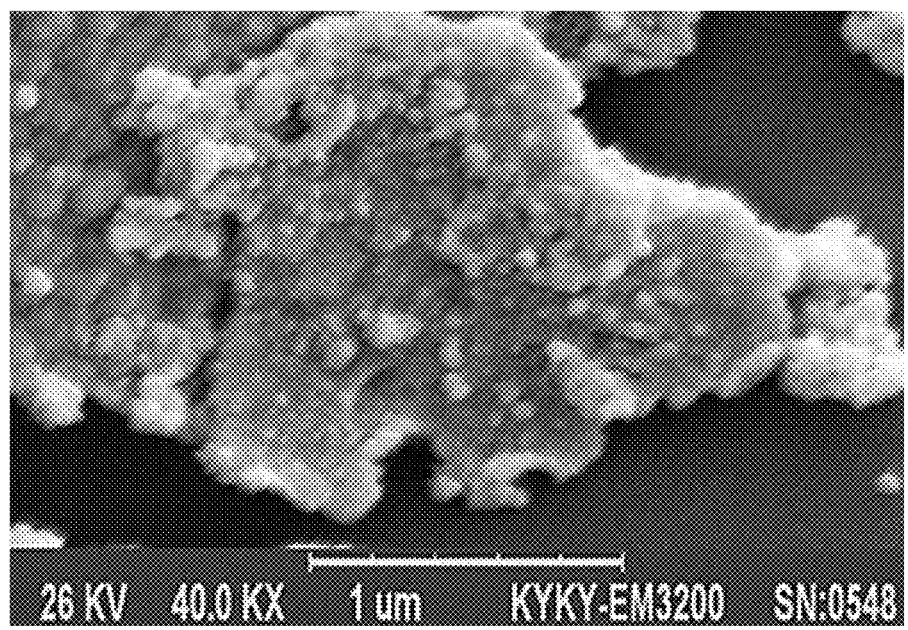
FIG. 10C illustrates an SEM micrograph of an exemplary nanomotor after a catalytic reduction of 4-nitrophenol, consistent with one or more exemplary embodiments of the present disclosure.

FIG. 10C illustrates an SEM micrograph of an exemplary nanomotor after a catalytic reduction of 4-nitrophenol, consistent with one or more exemplary embodiments of the present disclosure. Referring to FIG. 10C, it may be seen that the plurality of Zn nanoparticles were still present on the surface of the exemplary nanomotor. Also, the separated exemplary nanomotors were also added to the acidic solution again and it was shown that the hydrogen bubbles were still generated from the exemplary nanomotor. Therefore, the exemplary nanomotor showed high stability even after the catalytic reduction of nitroarenes.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in the light of the attached claims and their equivalents. Also, various modifications and changes may be made within the scope of the attached claims.

What is claimed is:

1. A method for decontamination of nitroarenes, the method comprising:
fabricating a nanomotor, comprising:
depositing a plurality of magnetic nanoparticles on an Au nanosheet; and
depositing a plurality of zinc (Zn) nanoparticles on the plurality of magnetic nanoparticles; and
chemically reducing nitroarenes of an acidic solution, comprising:
generating hydrogen bubbles in the acidic solution by adding the nanomotor to the acidic solution comprising reducing hydrogen ions of the acidic solution by causing a chemical reaction between the hydrogen ions and the plurality of Zn nanoparticles of the added nanometer; and
guiding the nanomotor in the acidic solution comprising guiding the plurality of magnetic nanoparticles by applying a magnetic force to the nanomotor.

2. The method of claim 1, wherein guiding the nanomotor in the acidic solution comprises:
detecting a polluted area in the acidic solution, the polluted area comprising an area of the acidic solution with a nitroarene concentration of at least 1 mM;
moving the nanomotor toward the polluted area by applying the magnetic force to the nanomotor.

3. The method of claim 1, wherein chemically reducing the nitroarenes of the acidic solution comprises chemically reducing the nitroarenes to aminoarenes using the nanomotor with a turn-over frequency (TOF) between $0.0165$ $s^{-1}$ and $0.0663$ $s^{-1}$.

4. The method of claim 1, wherein fabricating the nanomotor comprises fabricating the nanomotor using at least one of an electrochemical method, a physical vapor deposition method, a chemical vapor deposition method, and combinations thereof.

5. The method of claim 1, wherein generating the hydrogen bubbles comprises adding the nanomotor with a concentration between 0.5 mg/ml and 1.5 mg/ml to the acidic solution.

6. The method of claim 1, wherein generating the hydrogen bubbles comprises adding the nanomotor to the acidic solution with a nitroarene concentration of at least 1 mM.

7. The method of claim 1, wherein generating the hydrogen bubbles comprises adding the nanomotor to the acidic solution with a pH level of less than 4.

8. The method of claim 1, wherein the nitroarenes comprises at least one of 2-nitrophenol, 3-nitrophenol, 4-nitrophenol, 2-nitroaniline, 3-nitroaniline, 4-nitroaniline, and combinations thereof.

9. The method of claim 1, wherein the plurality of magnetic nanoparticles comprises at least one of nickel (Ni) nanoparticles, cobalt (Co) nanoparticles, and combinations thereof.

10. The method of claim 1, wherein depositing the plurality of magnetic nanoparticles on the Au nanosheet comprises:
forming the Au nanosheet, comprising:
forming an anodized gold (Au) electrode by applying an electrical potential between 5 V and 10 V to a gold (Au) electrode; and
reducing the anodized Au electrode by applying an electrical potential between −0.1 V and −0.5 V to the anodized Au electrode;
immersing the Au nanosheet in a solution of magnetic ions at a pH level between 4 and 5; and forming a first functionalized Au nanosheet by applying an electrical potential to the solution of magnetic ions.

11. The method of claim 1, wherein depositing the plurality of Zn nanoparticles on the plurality of magnetic nanoparticles comprises:
   immersing the first functionalized Au nanosheet in a solution of Zn ions; and
   forming a second functionalized Au nanosheet by applying an electrical potential to the solution of Zn ions.

12. The method of claim 1, wherein depositing the plurality of Zn nanoparticles on the plurality of magnetic nanoparticles comprises depositing the plurality of Zn nanoparticles with a diameter between 30 nm and 40 nm on the plurality of magnetic nanoparticles.

13. The method of claim 1, wherein depositing the plurality of magnetic nanoparticles on the Au nanosheet comprises depositing the plurality of magnetic nanoparticles on the Au nanosheet with a thickness between 60 nm and 80 nm.

14. A nanomotor for reducing nitroarenes, the nanomotor comprising:
   a gold (Au) nanosheet;
   a plurality of magnetic nanoparticles deposited on the Au nanosheet; and
   a plurality of zinc (Zn) nanoparticles deposited on the plurality of magnetic nanoparticles.

15. The nanomotor of claim 14, wherein the nanomotor comprises the Au nanosheet with a concentration between 80% and 90% of the weight of the nanomotor.

16. The nanomotor of claim 14, wherein the nanomotor comprises the Au nanosheet with a thickness between 60 nm and 80 nm.

17. The nanomotor of claim 14, wherein the plurality of Zn nanoparticles has a concentration between 10% and 20% of the weight of the nanomotor.

18. The nanomotor of claim 14, wherein a diameter of the plurality of Zn nanoparticles and the plurality of magnetic nanoparticles is between 30 nm and 40 nm.

19. The nanomotor of claim 14, wherein the plurality of magnetic nanoparticles has a concentration between 1% and 10% of the weight of the nanomotor.

20. The nanomotor of claim 14, wherein the plurality of magnetic nanoparticles comprises at least one of nickel (Ni) nanoparticles, cobalt (Co) nanoparticles, and combinations thereof.

* * * * *